(12) United States Patent
Yang

(10) Patent No.: US 8,804,049 B2
(45) Date of Patent: Aug. 12, 2014

(54) WIRELESS COMMUNICATION RECEIVER, A WIRELESS COMMUNICATION RECEIVING METHOD AND A TELEVISION RECEIVER

(75) Inventor: Shun-An Yang, Hsinchu County (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 432 days.

(21) Appl. No.: 12/865,398

(22) PCT Filed: Jan. 31, 2008

(86) PCT No.: PCT/CN2008/070229
§ 371 (c)(1),
(2), (4) Date: Jul. 30, 2010

(87) PCT Pub. No.: WO2009/100612
PCT Pub. Date: Aug. 20, 2009

(65) Prior Publication Data
US 2010/0321586 A1    Dec. 23, 2010

(51) Int. Cl.
*H04N 5/44* (2011.01)
*H04N 5/455* (2006.01)

(52) U.S. Cl.
USPC ........... 348/726; 348/725; 348/714; 375/250; 375/260

(58) Field of Classification Search
USPC ......... 348/725, 731–733, 553–570, 714–716; 370/509, 203, 208; 375/259, 260
See application file for complete search history.

(56) References Cited

U.S. PATENT DOCUMENTS 6,320,627 B1   11/2001  Scott
7,051,171 B1   5/2006   Liu
7,284,183 B2   10/2007  Wu
7,502,408 B2   3/2009   Kim
7,692,727 B2 * 4/2010   Yoon ............................ 348/732

(Continued)

FOREIGN PATENT DOCUMENTS

CN   1619523 A   5/2005
CN   1783315 A   6/2006

(Continued)

OTHER PUBLICATIONS

International application No. PCT/CN2008/070229, International filing date: Jan. 31, 2008, International Searching Report mailing date: Nov. 13, 2008.

(Continued)

*Primary Examiner* — Michael Lee
(74) *Attorney, Agent, or Firm* — Winston Hsu; Scott Margo

(57) ABSTRACT

The present invention relates to a wireless communication receiver, wireless communication receiving method and television receiver. The wireless communication receiver has signal processing circuits including a first signal processing circuit and a second signal processing circuit, a data storage module, and a deinterleaver. The first signal processing circuit receives a wireless communication signal and then performs a first signal processing to generate a first output data according to the wireless communication signal. The deinterleaver stores the first output data into the data storage module, and retrieves a deinterleaved data corresponding to the first output signal from the data storage module. The second signal processing circuit performs a second signal processing to generate a second output data according to the deinterleaved data. The data storage module is shared by the deinterleaver and at least one of the signal processing circuits for data storage, thereby effectively reducing the production cost.

34 Claims, 11 Drawing Sheets

(56) References Cited

U.S. PATENT DOCUMENTS

| | | | |
|---|---|---|---|
| 2005/0063421 A1* | 3/2005 | Wan et al. | 370/509 |
| 2005/0066074 A1 | 3/2005 | Suh | |
| 2007/0247936 A1 | 10/2007 | Direnzo | |
| 2007/0288832 A1 | 12/2007 | Adachi | |
| 2009/0015721 A1* | 1/2009 | Yu et al. | 348/725 |

FOREIGN PATENT DOCUMENTS

| | | | |
|---|---|---|---|
| CN | 1855798 A | 11/2006 | |
| CN | 101001337 A | 7/2007 | |
| WO | 2006044227 A1 | 4/2006 | |
| WO | 2007014043 A2 | 2/2007 | |
| WO | 2007120928 A2 | 10/2007 | |

OTHER PUBLICATIONS

Torsten Schorr et al.: "Diorama—An Open Source Digital Radio Mondiale (DRM) Receiver using MATLAB", Workshop Proceedings of IEEE Signal Processing 2005, Sep. 2005, Poznan, Poland, XP55000685.

* cited by examiner

First memory space configuration

Second memory space configuration

WIRELESS COMMUNICATION RECEIVER, A WIRELESS COMMUNICATION RECEIVING METHOD AND A TELEVISION RECEIVER

BACKGROUND

The disclosed embodiments of the present invention relate to wireless communication, and more particularly, to a wireless communication receiver (e.g., a digital television receiver), a wireless communication receiving method and a television receiver capable of sharing a data storage module (e.g., a memory) between a deinterleaver and a signal processing circuit (e.g., an MPEG decoder, an H.264 decoder or an AVS decoder).

Recently, the orthogonal frequency division multiplexing (OFDM) technique is widely adopted in a variety of wireless communication systems, such as digital television systems. In general, the digital television system is a television system which uses digital signals instead of commonly used analog signals for delivering television program contents. That is, the digital television system performs signal processing operations, such as digitization, compression, etc, upon an original signal including video information and audio information, and accordingly generates data streams. Next, the generated data streams are broadcasted via wireless communication means. Regarding a user end, a digital television receiver is used for receiving a wireless communication signal and extracting a video signal and an audio signal from the received wireless communication signal through adequate signal processing operations, such as the demodulating operation, the deinterleaving operation, the decoding operation, etc. Program contents of a channel selected by the user are played via output devices (e.g., a television screen and a speaker).

The digital television standards presently used in different areas in the world may be different. For example, People's Republic of China (P.R.C.) has defined its own digital television standard. However, no matter which digital television standard is employed, any digital television signal should be received by a digital television receiver. Please refer to FIG. 1, which is a block diagram illustrating a conventional digital television receiver 100. The digital television receiver 100 includes an antenna 102, a tuner 104, a demodulator 106, a backend decoder 108, and a plurality of memories 110 and 112. The antenna 102 receives the digital television signal which is a radio frequency signal. Next, the tuner 104 performs down-conversion and channel selection upon the received digital television signal, and the demodulator 106 performs demodulation upon an output of the tuner 104 for extracting a bit stream transmitted by the digital television signal. The backend decoder 108 generates video/audio signals to the following output devices (e.g., a television screen and a speaker) by performing a decoding operation, such as an MPEG (Moving Picture Experts Group) decoding operation, an H.264 decoding operation or an AVS (Audio Video coding Standard) decoding operation, upon the bit stream generated from the demodulator 106. In this way, program contents of a channel selected by the user are played on the output devices. In general, the backend decoder 108 and the demodulator 106 are designed separately, and are therefore disposed in different chips. Thus, the demodulator 106 has its own dedicated memory 110; similarly, the backend decoder 108 has its own dedicated memory 112.

Generally speaking, an interleaving operation may be performed to arrange the original data in a non-contiguous way before a transmitting end transmits the wireless communication signal, thereby mitigating the effect caused by channel fading. Regarding the digital television signal broadcasting, when the transmitting end is equipped with an interleaver, the digital television receiver 100 at the receiving end is therefore required to have a corresponding deinterleaver. For example, taking the digital television standard defined by P.R.C. for example, a convolutional deinterleaving operation is employed to arrange the original data in a non-contiguous way. However, compared with the interleaving techniques defined in other digital television standard (e.g., the DVB-T standard), the convolutional deinterleaver complying with the digital television standard defined by P.R.C. requires a large data buffer amount due to the shift registers implemented in a plurality of interleaving branches. This also means that the deinterleaving circuit in the demodulator 106 needs a large storage space to accomplish the deinterleaving operation. Thus, the conventional design often uses chip's external memory (e.g., the memory 110) to provide the desired storage space. However, as the memory 110 is only accessible to the demodulator 106 (for example, the memory 110 is only accessible to the deinterleaving circuit within the demodulator 106) and the memory 112 is only accessible to the backend decoder 108, such a conventional hardware configuration lacks flexibility in the use of memories. Besides, the production cost cannot be effectively reduced due to these dedicated memories 110 and 112.

SUMMARY

To solve the above-mentioned problems including low efficiency in the use of memories and high production cost, the present invention provides a wireless communication receiver (e.g., a television receiver) and a wireless communication receiving method which can improve the efficiency in the use of memories and effectively reduce the production cost.

According to a first aspect of the present invention, an exemplary wireless communication receiver is disclosed. The exemplary wireless communication receiver includes a data storage module, a deinterleaver, and a plurality of signal processing circuits. The deinterleaver is coupled to the data storage module, and utilized for storing a first output data into the data storage module and retrieving a deinterleaved data corresponding to the first output data from the data storage module. The signal processing circuits includes a first signal processing circuit and a second signal processing circuit. The first signal processing circuit is coupled to the deinterleaver, and utilized for receiving a wireless communication signal, and generating the first output data by performing a first signal processing operation according to the wireless communication signal. The second signal processing circuit is coupled to the deinterleaver, and utilized for generating a second output data by performing a second signal processing operation according to the deinterleaved data. The data storage module is shared by the deinterleaver and at least one of the signal processing circuits for data storage.

According to a second aspect of the present invention, an exemplary wireless communication receiving method is disclosed. The exemplary wireless communication receiving method includes following steps: performing a first signal processing operation for receiving a wireless communication signal and generating a first output data according to the wireless communication signal; performing a deinterleaving operation for storing the first output data into a data storage module and retrieving a deinterleaved data corresponding to the first output data from the data storage module; and performing a second signal processing operation for generating a second output data according to the deinterleaved data. The data storage module is shared by the deinterleaving operation and at least one of the first signal processing operation and the second signal processing operation for data storage.

According to a third aspect of the present invention, an exemplary wireless communication receiver is disclosed. The exemplary wireless communication receiver includes a data storage module, a memory bus, a deinterleaver, and a plurality of signal processing circuits. The memory bus is coupled to the data storage module. The deinterleaver is coupled to the data storage module, and utilized for storing a first output data into the data storage module and retrieving a deinterleaved data corresponding to the first output data from the data storage module. The signal processing circuits include a first signal processing circuit and a second signal processing circuit. The first signal processing circuit is coupled to the deinterleaver, and utilized for receiving a wireless communication signal and generating the first output data by performing a first signal processing operation according to the wireless communication signal. The second signal processing circuit is coupled to the deinterleaver, and utilized for generating a second output data by performing a second signal processing operation according to the deinterleaved data. The deinterleaver and at least one of the signal processing circuits access the data storage module via the memory bus.

According to a fourth aspect of the present invention, an exemplary television receiver is disclosed. The exemplary television receiver includes a data storage module, a demodulator, and a backend decoder. The demodulator is utilized for receiving and demodulating a digital television signal and accordingly generating a bit stream. The demodulator includes a first signal processing circuit, a deinterleaver, an error-correction decoding module, and a descrambler. The first signal processing circuit is utilized for generating a first output data by performing a first signal processing operation according to the digital television signal. The deinterleaver is coupled to the first signal processing circuit and the data storage module, and utilized for storing the first output data into the data storage module and retrieving a deinterleaved data corresponding to the first output data from the data storage module. The error-correction decoding module is coupled to the deinterleaver, and utilized for performing an error-correction decoding operation according to the deinterleaved data. The descrambler is coupled to the error-correction decoding module, and utilized for generating the bit stream by performing a descrambling operation according to an output of the error-correction decoding module. The backend decoder is coupled to the demodulator, and utilized for receiving and decoding the bit stream. The data storage module is shared by the deinterleaver and the backend decoder for data storage.

With the design of making the deinterleaver and other circuit(s) share the same data storage module, the above-mentioned wireless communication receiver, wireless communication receiving method and television receiver can achieve the objective of improving the efficiency in the use of memories and effectively reducing the production cost.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
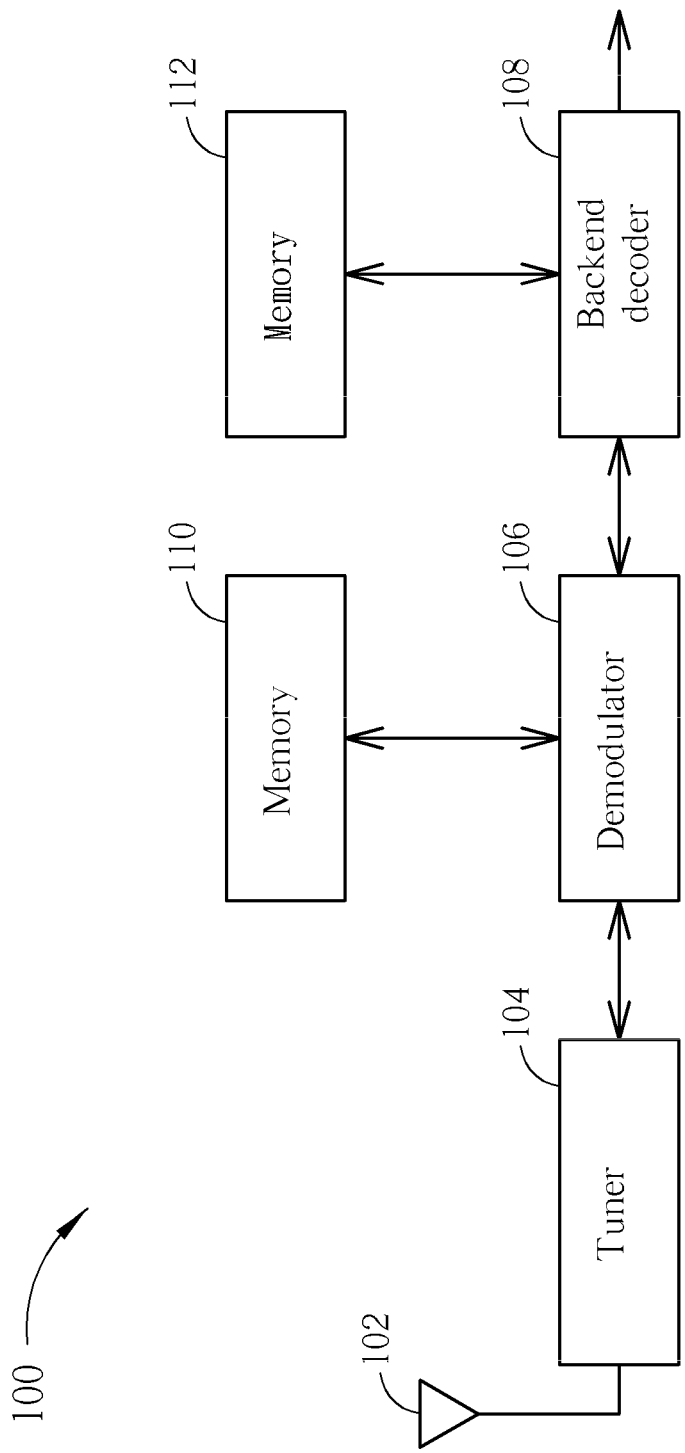
FIG. 1 is a block diagram illustrating a conventional digital television receiver.
Figure 2:
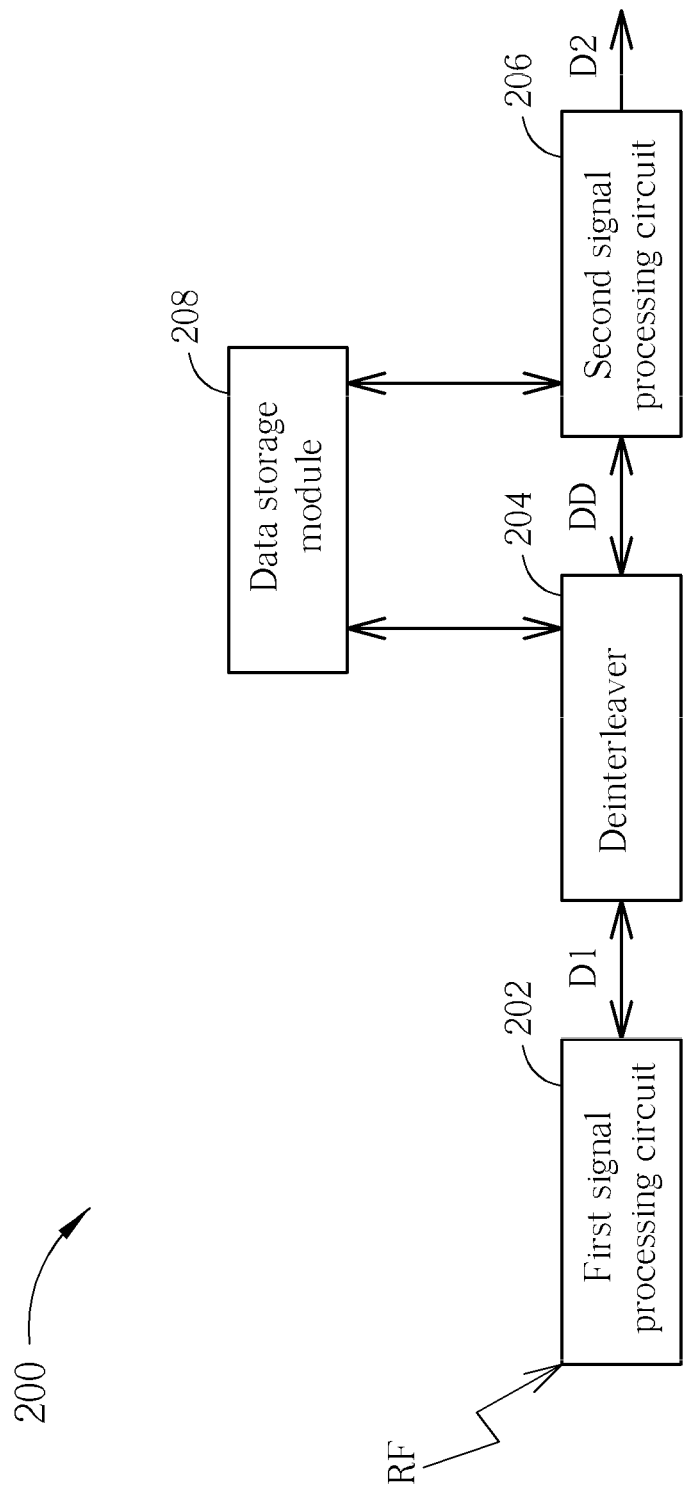
FIG. 2 is a block diagram illustrating a generalized wireless communication receiver according to an exemplary embodiment of the present invention.

FIG. 2 is a block diagram illustrating a generalized wireless communication receiver according to an exemplary embodiment of the present invention. The exemplary wireless communication receiver 200 includes, but is not limited to, a first signal processing circuit 202, a deinterleaver 204, a second signal processing circuit 206, and a data storage module 208. As shown in the figure, the same data storage module 208 is shared by the deinterleaver 204 and the second signal processing circuit 206 for data storage. That is, the data storage module 208 is not a dedicated storage element of either of the deinterleaver 204 and the second signal processing circuit 206. The first signal processing circuit 202 receives the wireless communication signal RF, and generates a first output data D1 to the deinterleaver 204 by performing a first signal processing operation according to the received wireless communication signal RF. Next, the deinterleaver 204 stores the first output data D1 into the data storage module 208, and retrieves a deinterleaved data DD corresponding to the first output data D1 from the data storage module 208. The second signal processing circuit 206 receives the deinterleaved data DD generated from the deinterleaver 204, and generates a second output data D2 to the following circuit element(s) (not shown) by performing a second signal processing operation upon the received deinterleaved data DD. In this exemplary embodiment of the present invention, the wireless communication receiver 100 is a digital television receiver which receives a digital television signal transmitted in an orthogonal frequency division multiplexing (OFDM) manner (e.g., a wireless communication signal RF complying with the digital television standard defined by P.R.C.), and retrieves the digital television channel content (i.e., the second output data D2) from the received digital television signal and transmits the retrieved television channel content to the following output device (e.g., a screen and/or a speaker) for playback.

Please note that, in the circuit structure shown in FIG. 2, the same data storage module 208 is shared by the deinterleaver 204 and the second signal processing circuit 206 (which is a backend circuit of the deinterleaver 204) for data storage. However, this is for illustrative purposes only, and is not meant to be a limitation of the present invention. For example, in another exemplary embodiment obeying the spirit of sharing the data storage module 208 between different circuits, the data storage module 208 may be shared by the deinterleaver 204 and the first signal processing circuit 202 (which is a front-end circuit of the deinterleaver 204) for data storage. This also falls within the scope of the present invention.

FIG. 2 only shows a generalized structure of the wireless communication receiver of the present invention for briefly illustrating that the data storage module used by the deinterleaver to accomplish the deinterleaving operation can be also used by other circuit(s) of the wireless communication receiver. To more clearly describe technical features of the present invention, examples are given as below.

Figure 3:
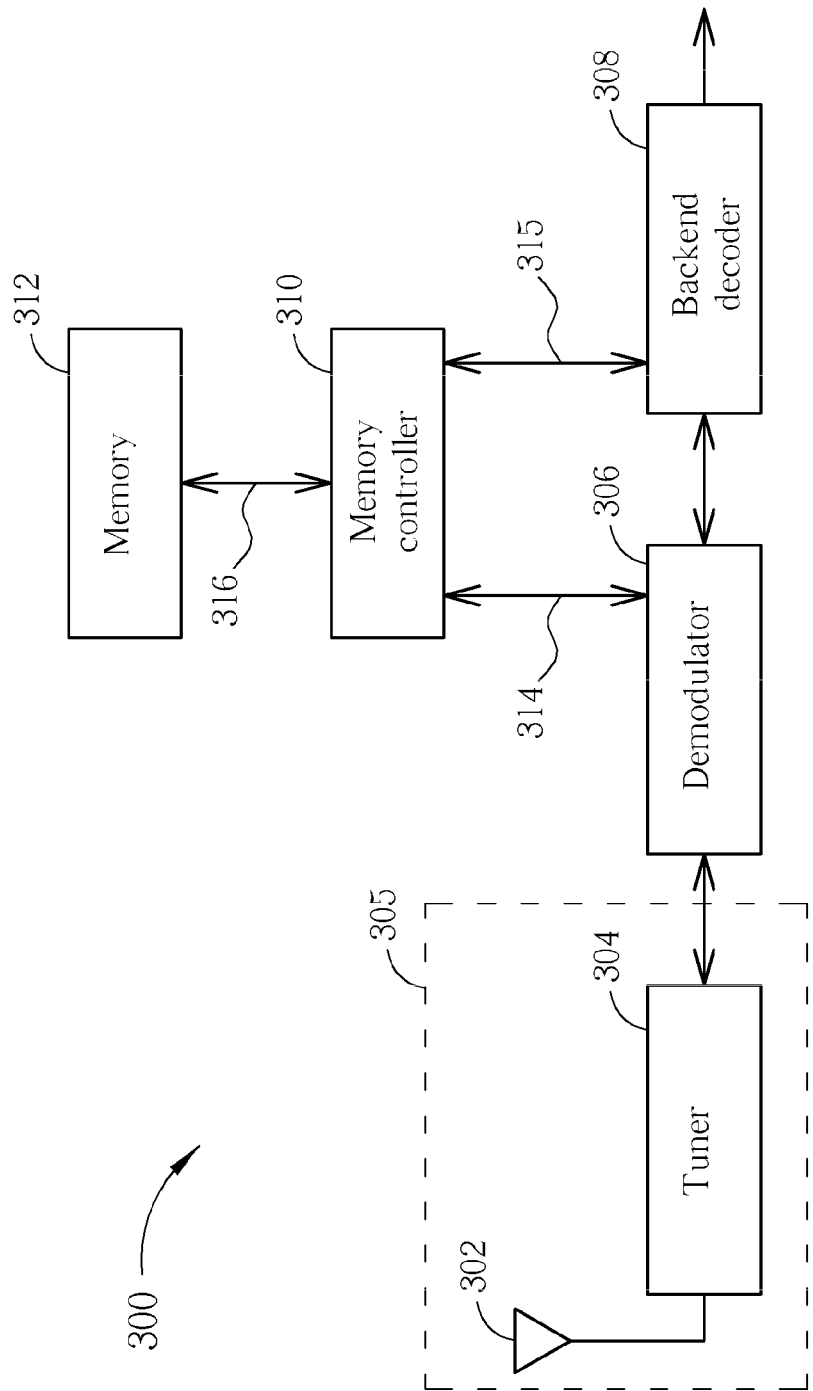
FIG. 3 is a block diagram illustrating an exemplary embodiment of a wireless communication receiver of the present invention.

Please refer to FIG. 3, which is a block diagram illustrating an exemplary embodiment of a wireless communication receiver of the present invention. In this exemplary embodiment, the wireless communication receiver 300 includes an antenna 302, a tuner 304, a demodulator 306, a backend decoder 308, a memory controller 310, and a memory 312. The wireless communication receiver 300 shown in FIG. 3 is an exemplary implementation which employs the circuit structure shown in FIG. 2. The antenna 302 receives a digital television signal, and then the tuner 304 performs down-conversion and channel selection upon the received digital television signal. That is, the combination of the antenna 302 and the tuner 304 acts as a signal receiving circuit 305 for receiving the wireless communication signal (e.g., the digital television signal), and generates a received signal to the demodulator 306. The demodulator 306 demodulates an output of the tuner 304 to extract a bit stream transmitted via the digital television signal. The backend decoder 308 performs a decoding operation (e.g., an MPEG decoding operation, an H.264 decoding operation or an AVS decoding operation) upon the bit stream generated from the demodulator 306, and accordingly generates a video/audio signal to the following output device (e.g., a screen and/or a speaker) for playback of the digital television channel content selected by the user. In this exemplary embodiment, the data storage module 208 shown in FIG. 2 is realized by the memory 312, and the deinterleaver 204 shown in FIG. 2 is realized by a deinterleaver (not shown in FIG. 3 but will be detailed later) which is disposed in the demodulator 306. Besides, as can be readily known by referring to FIG. 2 in conjunction with FIG. 3, a combination of the antenna 302, the tuner 304, and a portion of the demodulator 306 (please note that this portion of the demodulator 306 does not have the aforementioned deinterleaver included therein) correspond to the first signal processing circuit 202 shown in FIG. 2, and a combination of another portion of the demodulator 306 (please note that this portion of the demodulator 306 does not have the aforementioned deinterleaver included therein) and the backend decoder 308 correspond to the second signal processing circuit 206 shown in FIG. 2. In this exemplary embodiment, the memory 312, such as a dynamic random access memory (DRAM) or a synchronous dynamic random access memory (SDRAM), is shared by the deinterleaver within the demodulator 306 and the backend decoder 308. Therefore, when the deinterleaver within the demodulator 306 and the backend decoder 308 issue memory access requests (e.g., memory write requests and/or memory read requests), respectively, the memory controller 310 is responsible for arbitrating an access right of the memory 312 requested by the deinterleaver within the demodulator 306 and the backend decoder 308. Next, the memory controller 310 performs write operations/read operations upon the memory 312 according to the memory write requests/memory read requests. It should be noted that memory address and data are transmitted via a memory bus 316 coupled between the memory controller 310 and the memory 312. In other words, the deinterleaver within the demodulator 306 and the backend decoder 308 share the memory 312 through the same memory bus 316.

Figure 4:
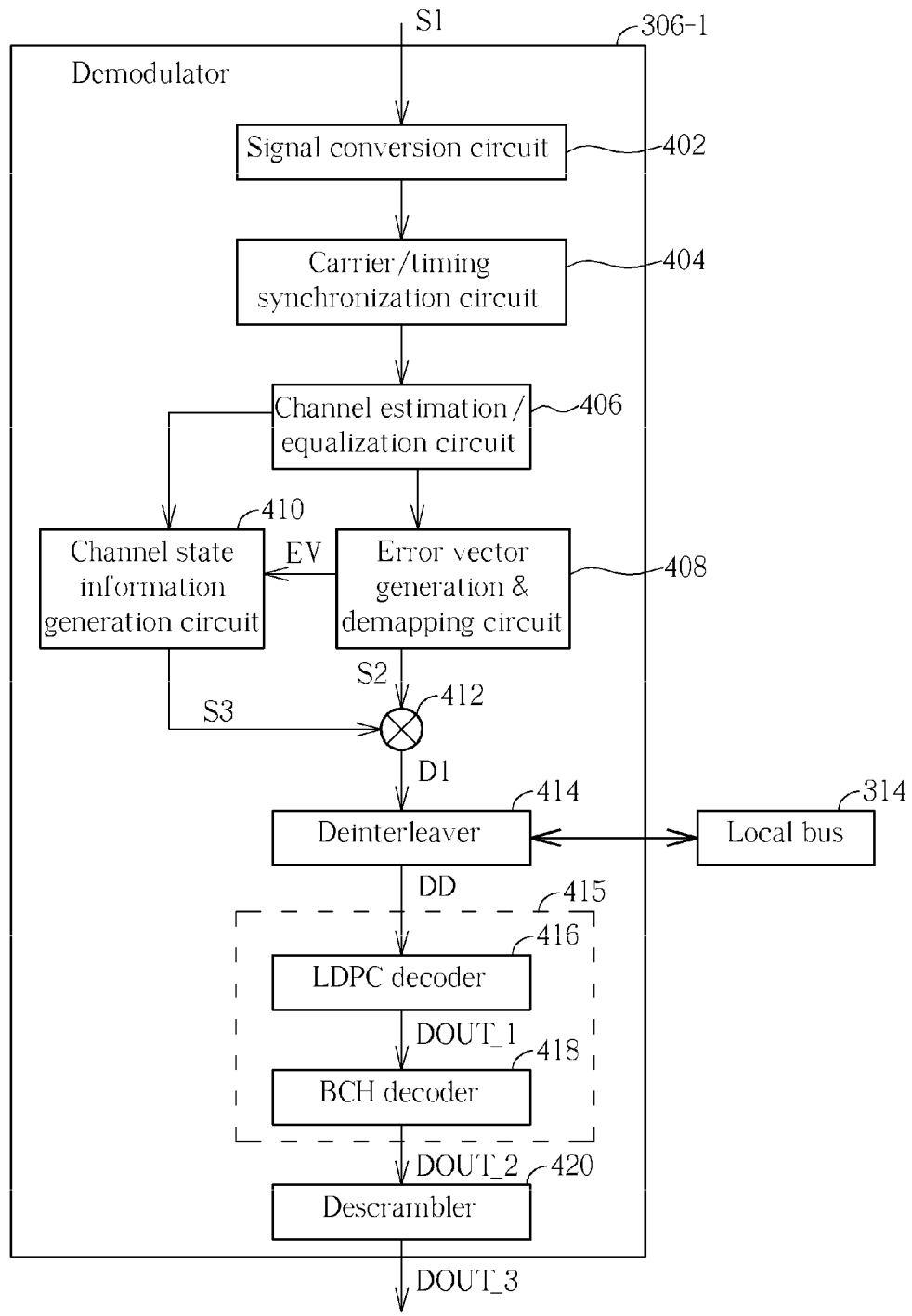
FIG. 4 is a diagram illustrating a first exemplary embodiment of a demodulator shown in FIG. 3.

Please refer to FIG. 3 in conjunction with FIG. 4. FIG. 4 is a diagram illustrating a first exemplary embodiment of the demodulator 306 shown in FIG. 3. In this exemplary embodiment, the demodulator 306-1 includes, but is not limited to, a signal conversion circuit 402, a carrier/timing synchronization circuit 404, a channel estimation/equalization circuit 406, an error vector generation & demapping circuit 408, a channel state information generation circuit 410, a multiplier 412, a deinterleaver 414, an error-correction decoding module 415, and a descrambler 420. The tuner 304 shown in FIG. 3 generates a received signal S1 according to a wireless communication signal (e.g., a digital television signal) received by the antenna 302. The received signal S1 may be an intermediate frequency (IF) signal or a baseband signal. If the received signal S1 is an IF signal, the demodulator 306 requires an additional down-conversion circuit (not shown) implemented therein for converting the IF signal into a baseband signal, and feeds the baseband signal into the signal conversion circuit 402 for analog-to-digital conversion. On the other hand, if the received signal S1 generated from the tuner 304 is already a baseband signal, the received signal S1 is directly fed into the signal conversion circuit 402 for analog-to-digital conversion. The carrier/timing synchronization circuit 404 makes the receiving end synchronized with the transmitting end to thereby allow the receiving end to correctly deal with OFDM symbols transmitted by the wireless communication signal. The channel estimation/equalization circuit 406 is utilized to perform channel estimation/equalization. Based on an output of the channel estimation/equalization circuit 406, the error vector generation & demapping circuit 408 generates an error vector EV to the channel state information generation circuit 410 and a demapping output S2 to the multiplier 412, wherein the demapping output S2 is a soft decision output and therefore contains a plurality of soft decision bits. The channel state information generation circuit 410 estimates the quality of the received symbols/bits by referring to the output of the channel estimation/equalization circuit 406 and/or the error vector EV, and accordingly generates the channel state information S3. Next, the multiplier 412 generates the first output data D1 to the deinterleaver 414 according to the demapping output S2 and the channel state information S3. Please note that the first output data D1 is a soft decision output rather than a hard decision output. The deinterleaver 414 uses the memory 312 shown in FIG. 3 as the storage required to accomplish the deinterleaving operation. Therefore, the deinterleaver 414 accesses the memory 312 via the local bus 314. In this exemplary embodiment, the deinterleaver 414 stores the first output data D1 into the memory 312 and then retrieves a deinterleaved data DD corresponding to the first output data D1 from the memory 312 via the local bus 314 and the memory controller 310 shown in FIG. 3. An error-correction decoding operation is required to process the deinterleaved data DD. As the transmitting end may use the well-known low-density parity-check (LDPC) code as an inner code and uses the well-known Bose-Chaudhuri-Hocquengham (BCH) code as an outer code, the error-correction decoding module 415 employed for performing the error-correction decoding operation therefore contains an LDPC decoder 416 and a BCH decoder 418, wherein the LDPC decoder 416 generates an LDPC decoding output DOUT_1 by performing an LDPC decoding operation upon the deinterleaved data DD, and the BCH decoder 418 generates a BCH decoding output DOUT_2 by performing a BCH decoding operation upon the LDPC decoding output DOUT_1. In general, the transmitting end may use a scrambler to perform a scrambling operation upon data to be transmitted to thereby avoid a long sequence of consecutive 0's or 1's. Therefore, regarding the receiving end, the demodulator 316-1 in this exemplary embodiment has the corresponding descrambler 420 implemented therein to perform a descrambling operation upon the BCH decoding output DOUT_2 generated from the BCH decoder 418. The descrambler 420 therefore outputs a bit stream DOUT_3 to a following processing circuit, such as the backend decoder 308 shown in FIG. 3.

Figure 5:
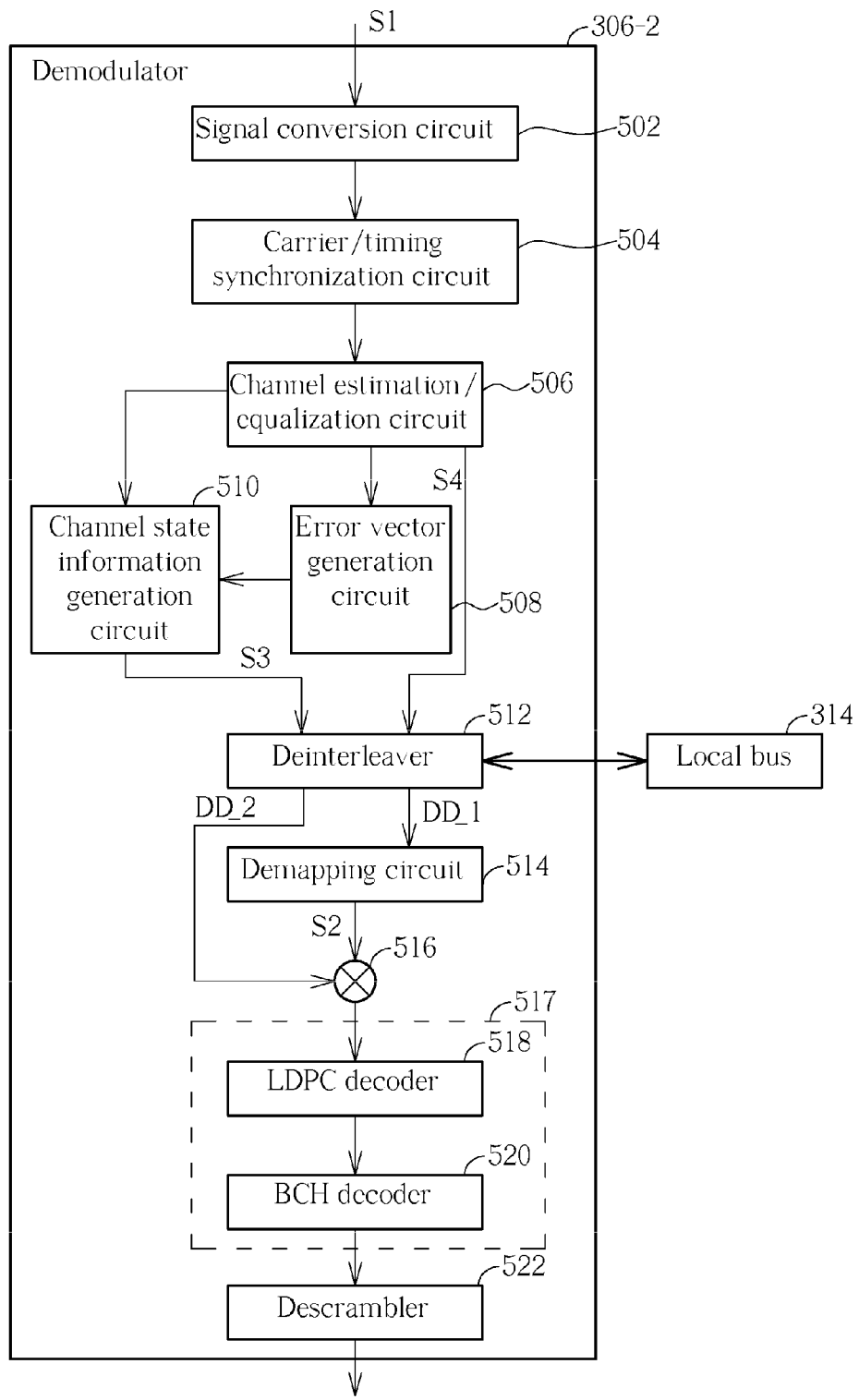
FIG. 5 is a diagram illustrating a second exemplary embodiment of the demodulator shown in FIG. 3.

In the exemplary embodiment shown in FIG. 4, the deinterleaver 414 is used to deinterleave a product of the demapping output S2 and the channel state information S3. However, this is for illustrative purposes only, and is not mean to be a limitation of the present invention. Please refer to FIG. 5, which is a diagram illustrating a second exemplary embodiment of the demodulator 306 shown in FIG. 3. In this exemplary embodiment, the demodulator 306-2 includes, but is not limited to, a signal conversion circuit 502, a carrier/timing synchronization circuit 504, a channel estimation/equalization circuit 506, an error vector generation circuit 508, a channel state information generation circuit 510, a deinterleaver 512, a demapping circuit 514, a multiplier 516, an error-correction decoding module 517, and a descrambler 522, wherein the error-correction decoding module 517 includes an LDPC decoder 518 and a BCH decoder 520. The major difference between the exemplary embodiments shown in FIG. 4 and FIG. 5 is that a channel estimation/equalization output S4 generated from the channel estimation/equalization circuit 506 and a channel state information S3 generated from the channel state information generation circuit 510 are fed into the deinterleaver 512 for deinterleaving, respectively. Therefore, the deinterleaver 512 respectively stores the channel estimation/equalization output S4 and the channel state information S3 into the memory 312 and respectively retrieves a deinterleaved data DD_1 corresponding to the channel estimation/equalization output S4 and a deinterleaved data DD_2 corresponding to the channel state information S3 from the memory 312 via the local bus 314 and the memory controller 310 shown in FIG. 3. That is, in this exemplary embodiment, the first input data received by the deinterleaver 512 includes the channel estimation/equalization output S4 and the channel state information S3, and a deinterleaved data corresponding to the first input data includes the deinterleaved data DD_1 and the deinterleaved data DD_2. As shown in FIG. 5, the deinterleaved data DD_1 is further processed by the demapping circuit 514, and the demapping circuit 514 accordingly generates a demapping output S2. The multiplier 516 generates an output according to the demapping output S2 and the deinterleaved data DD_2 corresponding to the channel state information S3, and then the output of the multiplier 516 is processed by error-correction decoding operations sequentially performed by the LDPC decoder 518 and the BCH decoder 520. After an output of the BCH decoder 520 is descrambled by the descrambler 522, a desired bit stream is generated from the demodulator 306-2 to a following processing circuit, such as the backend decoder 308 shown in FIG. 3. As the elements with the same name in FIG. 4 and FIG. 5 have the same or similar function and operation, a person skilled in the art can readily understand the operations and functions of elements shown in FIG. 5 after reading above paragraphs directed to the exemplary embodiment shown in FIG. 4. Further description is therefore omitted here for brevity.

In above-mentioned exemplary embodiment, the deinterleaver 414/512 of the demodulator 306-1/306-2 shares the same memory 312 with the backend decoder 308. The present invention therefore further proposes a scheme for elastically adjusting a storage space allocation of the memory 312. Regarding the exemplary embodiment shown in FIG. 4, the demapping output S2 is a soft decision output and contains a plurality of soft bits. As known to those skilled in the art, each soft decision bit is composed of a plurality of bits. Similarly, regarding the exemplary embodiment shown in FIG. 5, the channel estimation/equalization output S4 also contains a plurality of soft decision bits each being composed of a plurality of bits. To put it another way, the deinterleaver 414/512 proposed in the present invention is used for processing a soft decision output rather than a hard decision output. Thus, when storing each soft decision bit into the memory 312, the deinterleaver 414/512 can selectively reduce the number of bits in the soft decision bit that are actually stored into the memory 312. That is, the deinterleaver 414/512 can selectively reduce the bit width of the soft decision bit stored into the memory 312. In this way, the storage space requirement of the deinterleaving operation performed by the deinterleaver 414/512 can be lowered. In a condition where the memory 312 has a limited storage capacity, the available storage space in the memory 312 that is allocated to the backend decoder 308 can be effectively increased.

Figure 6A:
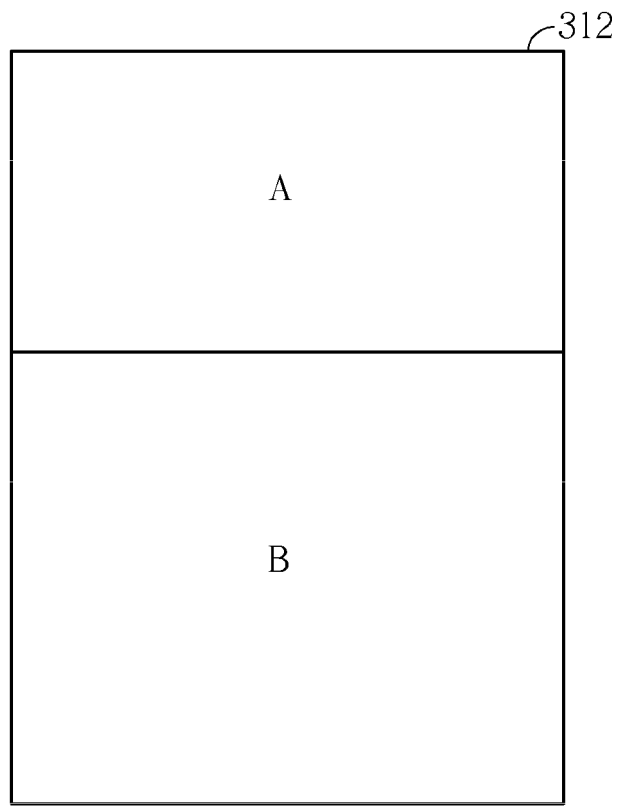
FIG. 6A and FIG. 6B are diagrams illustrating different exemplary memory space configurations corresponding to a memory shown in FIG. 3.
Figure 6B:
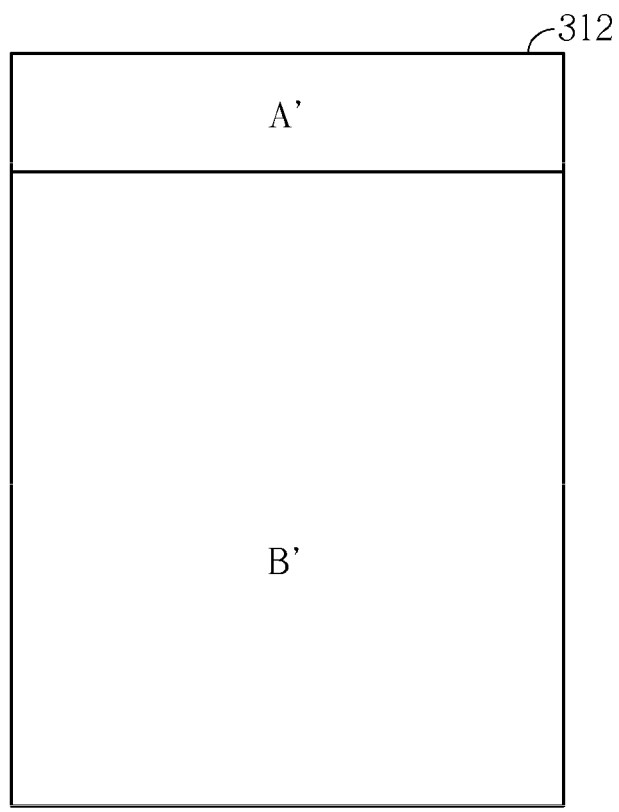

FIG. 6A and FIG. 6B are diagrams illustrating different exemplary memory space configurations corresponding to the memory 312 shown in FIG. 3. In a case where the first memory space configuration as shown in FIG. 6A is employed, the backend decoder 308 only uses the storage space B, and the storage space A allocated to the deinterleaver 414/512 allows the deinterleaver 414/512 to store each complete soft decision bit into the memory 312. However, when the backend decoder 308 needs to use a larger storage space due to certain reasons (for example, the backend decoder 308 has additional functions implemented therein due to change of the original design or the backend decoder 308 temporarily needs additional storage space during the execution of a specific decoding operation), the second memory space configuration as shown in FIG. 6B is employed under the same total storage capacity of the memory 312. As shown in the figure, the storage space A' is smaller than the storage space A, whereas the storage space B' is larger than the storage space B. As the storage space in the memory 312 that is available to the deinterleaver 414/512 is reduced now, the deinterleaver 414/512 may reduce the number of bits in each soft decision bit when storing the soft decision bit into the memory 312. For example, the write operation performed by the deinterleaver 414/512 drops one bit of each soft decision bit. That is, each soft decision bit has one missing bit after the deinterleaving operation is performed. Regarding the following LDPC decoder 416/518, the missing bit is padded with "0" to thereby allow the LDPC decoder to accomplish the LDPC decoding operation. In other words, the present invention proposes dynamically adjusting the bit width of data stored into the memory 312 for optimizing the use of the limited storage capacity of the memory 312 with slight receiver performance degradation or no receiver performance degradation.

Figure 7:
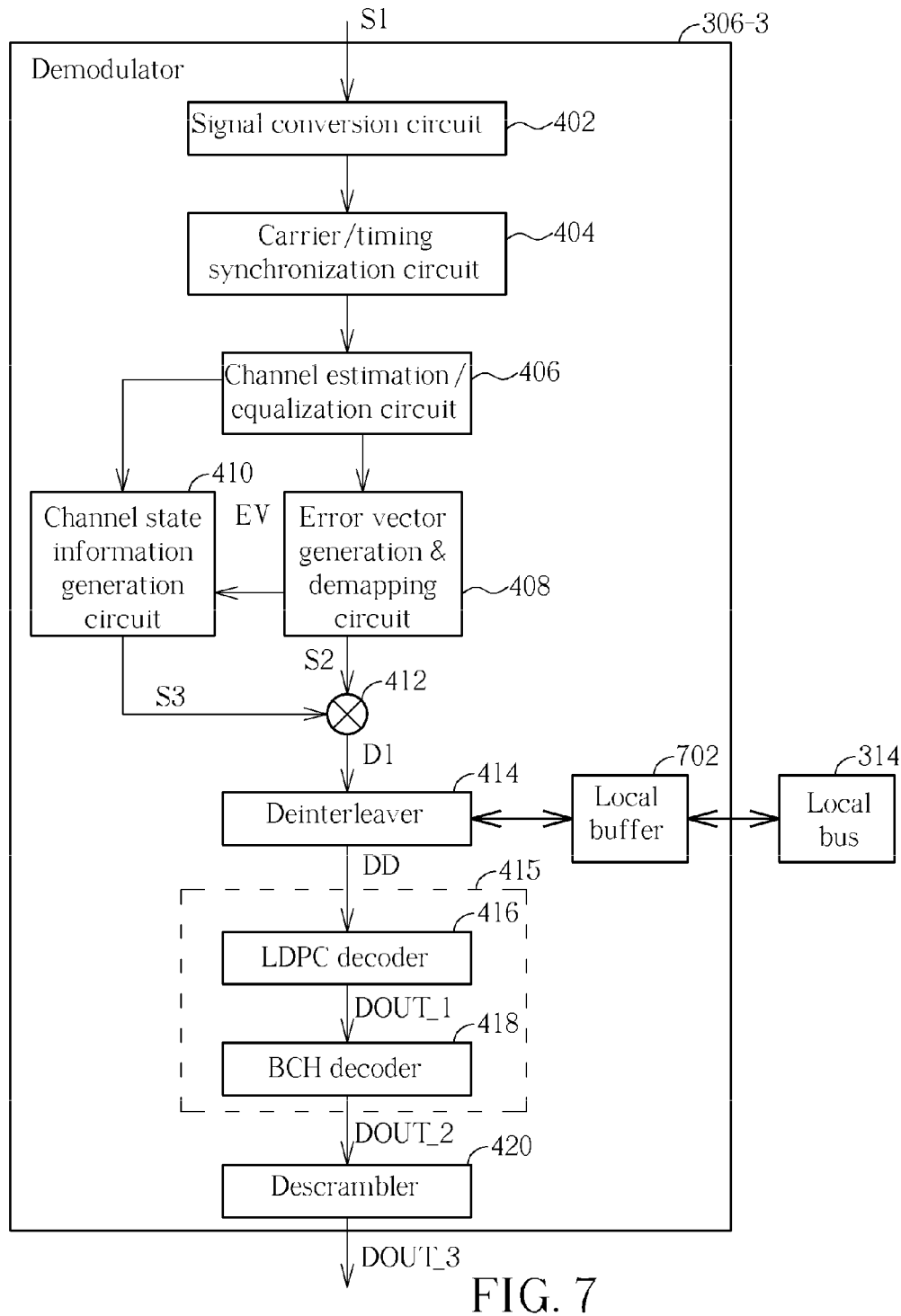
FIG. 7 is a third exemplary embodiment of the demodulator shown in FIG. 3.

To achieve the objective of adjusting the bit width of data stored into the memory 312, the present invention proposes using a data buffer module coupled between the memory 312 and the deinterleaver 414/512. Please refer to FIG. 7, which is a third exemplary embodiment of the demodulator 306 shown in FIG. 3. The exemplary embodiment shown in FIG. 7 is similar to that shown in FIG. 4, and the major difference therebetween is that the demodulator 306-3 has an additional local buffer 702 disposed between the deinterleaver 414 and the local bus 314. Please note that the local buffer 702 and the deinterleaver 414 are both disposed inside the same chip (i.e., the same demodulator chip); however, the memory 312 shown in FIG. 3 is disposed outside of the chip. Suppose that the bit width of the first output data D1 (which is a soft decision output) is M. When the second memory allocation shown in FIG. 6 is employed, the write operation performed by the deinterleaver 414 drops N bits in each soft decision bit of the first output data D1, wherein each soft decision bit of the first output data D1 contains M bits in total. That is, when each soft decision bit of the first output data D1 is to be buffered in the local buffer 702, only (M–N) bits will be actually stored into the local buffer 702. Next, the local buffer 702 outputs each buffered soft decision bit having (M–N) bits to the external memory 312 via the local bus 314.

In addition, the local buffer 702 may further have the transmission format conversion function. That is, supposing that the bit width of each soft decision bit in the first output data D1 is different from the bus width of the memory 312, the local buffer 702 buffers each soft decision bit in the first output data D1, and then transmits the buffered data to the memory 312 according to the bus width of the memory 312. In other words, each data set of the first output data D1 (e.g., each soft decision bit of the first output data D1) has a first bit width; however, each data transmission between the local buffer 702 and the memory 312 follows a second bit width different from the first bit width. Similarly, when the deinterleaver 414 wants to read the deinterleaved data from the memory 312, the memory 312 transmits the deinterleaved data to the local buffer 702 according to its bus width, and then the deinterleaver 414 reads each deinterleaved soft decision bit from the local buffer 702.

Figure 8:
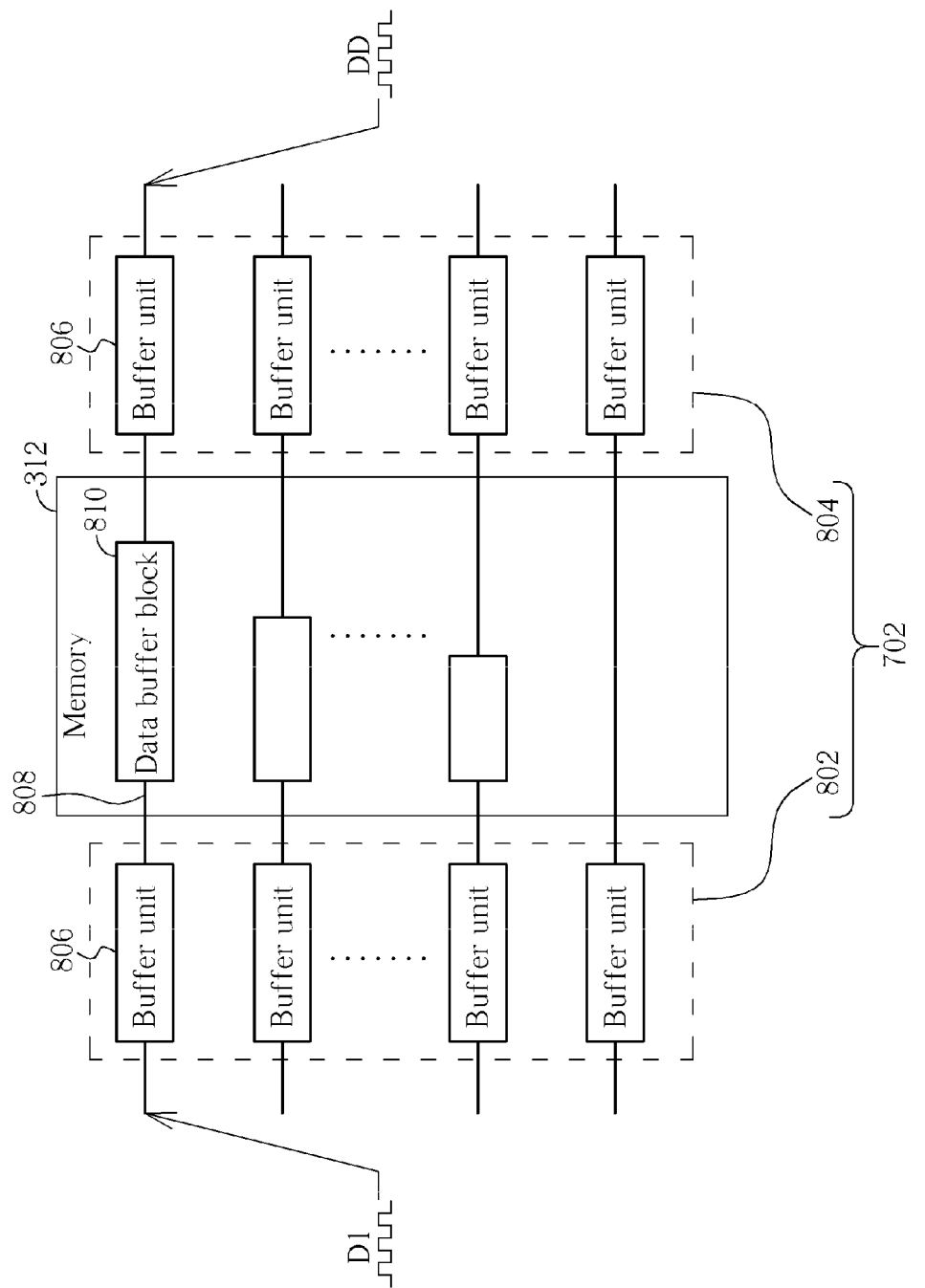
FIG. 8 is an exemplary embodiment of a local buffer shown in FIG. 7.

Moreover, using the local buffer 702 may further improve the overall system performance due to reduced number of times of reading data from and/or writing data into the memory 312. Please refer to FIG. 8, which is an exemplary embodiment of the local buffer shown in FIG. 7. In this exemplary embodiment, the local buffer 702 includes an input buffer 802 and an output buffer 804, wherein the input buffer 802 and the output buffer 804 have a plurality of buffer units 806, respectively. In addition, each of the buffer units 806 has the same storage capacity. For example, each buffer unit 806 has the same storage capacity for buffering 16 OFDM symbols. As the deinterleaver 414 performs the convolutional deinterleaving operation, a plurality of deinterleaving branches 808 are required for accomplishing the convolutional deinterleaving operation. As shown in the figure, supposing that there are Y deinterleaving branches, data buffer blocks 808 with different buffer lengths are disposed at (Y–1) deinterleaving branches, respectively, wherein the operation of each data buffer block 808 is similar to that of a shift register. Regarding the input buffer 802, a buffer unit 806 is disposed at each deinterleaving branch 808. Similarly, regarding the output buffer 804, a buffer unit 806 is disposed at each deinterleaving branch. When a data amount of the first output data D1 buffered in a buffer unit 806 reaches a predetermined value (e.g., the buffer unit 806 is full), the buffer unit 806 continuously writes its buffered data into the memory 312 through the corresponding deinterleaving branch. In other words, only when the accumulated data of the input buffer 802 that is to be stored into the memory 312 reaches a certain data amount, the input buffer 802 performs one write operation. Regarding the output buffer 804, the memory 312 continuously outputs data to a corresponding buffer unit 806 in the output buffer 804 until a data amount of buffered data in the output buffer 804 reaches a predetermined value (e.g., the output buffer 804 is full). Next, the deinterleaver 414 reads the desired deinterleaved data DD from the output buffer 804. That is, in one read operation, the memory 312 continuously outputs data to the output buffer 804 until the accumulated data of the output buffer 804 that is to be transmitted to the deinterleaver 414 reaches a certain data amount.

General speaking, the deinterleaving operation requires frequent write operations and read operations performed upon the memory 312. Besides the deinterleaver 414, the memory 312 may be used by the backend decoder 308 for data storage. In addition, the frequent memory accesses of the memory 312 may degrade the overall system performance. However, with the help of the implemented input buffer 802 and output buffer 804, the number of times of writing data into and/or reading data from the memory 312 can be greatly reduced, thereby mitigating the influence on the backend decoder 308 that is resulted from the memory accesses performed by the deinterleaver 414. In this way, the overall system performance can be greatly improved.

Figure 9:
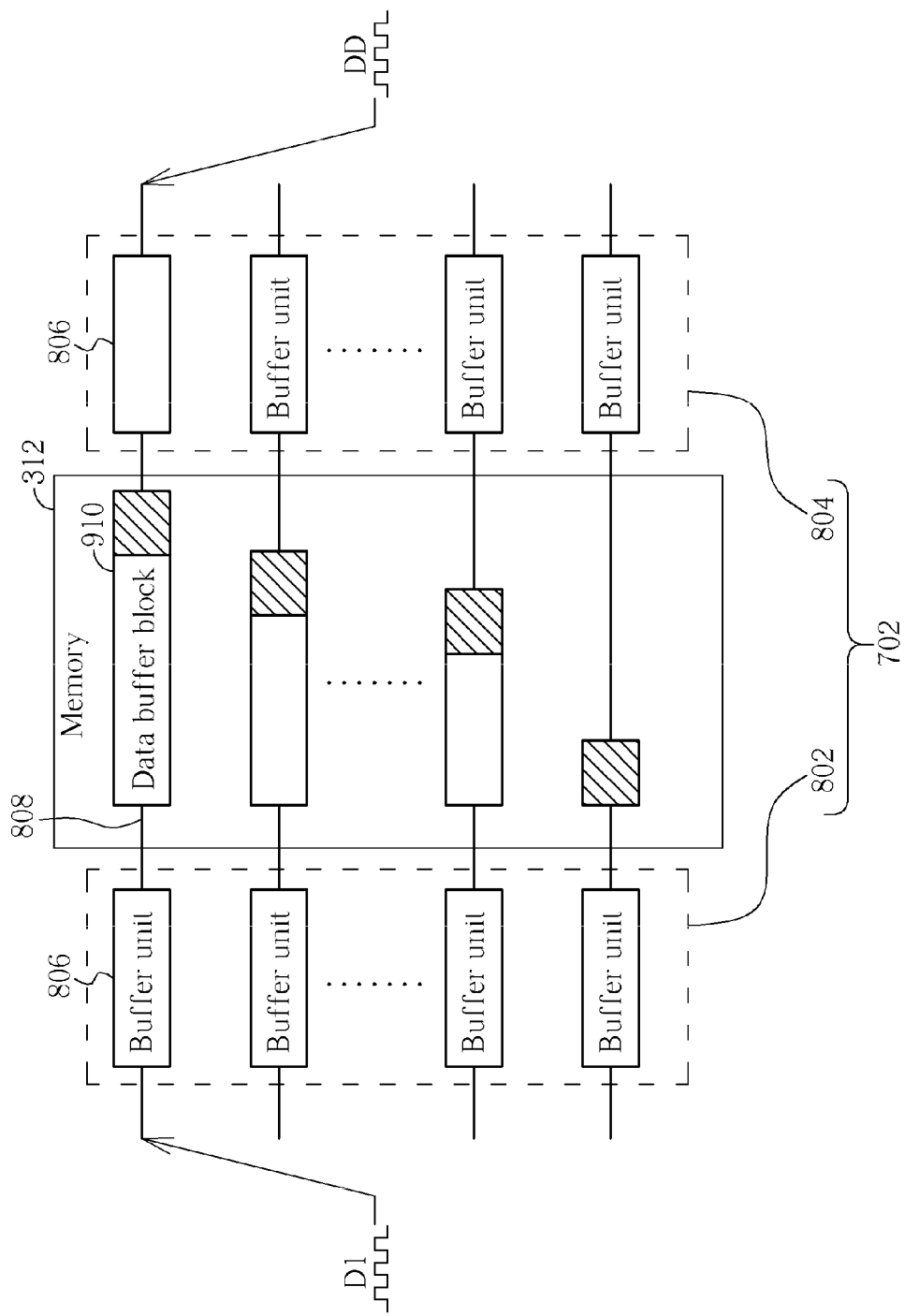
FIG. 9 is a diagram illustrating that each deinterleaving branch in a memory has one additionally allocated buffer space.

Regarding the LDPC decoder, it uses blocks as basic units to deal with the decoding of LDPC codes. For example, one block may contain 7488 bits. Therefore, regarding each deinterleaving branch, the present invention further allocates additional buffer space in the shared memory for the LDPC decoder of the demodulator, wherein the shared memory is used by the backend decoder (e.g., an MPEG decoder, an H.264 decoder, or an AVS decoder) and the deinterleaver in the demodulator. In this way, when performing the read operation, the deinterleaver is capable of feeding a great amount of deinterleaved data, even a data amount of a whole block, into the LDPC decoder. As shown in FIG. 9, the memory 312 includes a plurality of data buffer blocks 910 respectively corresponding to the deinterleaving branches 808. Compared to the memory 312 shown in FIG. 8, the memory 312 in FIG. 9 has one additional buffer space allocated to each deinterleaving branch 808. Please note that each additionally allocated buffer space is represented by an area marked by oblique lines in FIG. 9. It should be noted that the size of each additionally allocated buffer space shown in FIG. 9 is for illustrative purposes only. That is, the size of each additionally allocated buffer space may be adjusted, depending upon the actual design requirement/consideration. The buffer lengths of the data buffer blocks 910 are greater than minimum buffer lengths required by the corresponding deinterleaving branches 808 involved in performing the convolutional deinterleaving operation (e.g., the buffer lengths of the data buffer blocks 810 shown in FIG. 8), respectively.

When accessing the memory, the conventional deinterleaver has to write one symbol into the memory immediately after one symbol is read from the memory. However, compared to the conventional deinterleaver design, when accessing the memory 312, the exemplary deinterleaver of the present invention is not required to write N symbols into the memory 312 immediately after N symbols are read from the memory 312 due to the fact that each deinterleaving branch 808 has additionally allocated buffer space. Therefore, the use of the exemplary deinterleaver of the present invention is more flexible.

Please note that, in the exemplary embodiment of FIG. 9, the deinterleaver 414 cooperates with the memory 312 which has additional buffer space allocated therein and the above-mentioned local buffer 702 to thereby gain the above-mentioned benefits/advantages. However, this is for illustrative purposes only, and is not meant to be a limitation of the present invention. That is, in another exemplary embodiment, the deinterleaver 414 may only cooperate with the memory 312 having additional buffer space allocated therein. This also falls within the scope of the present invention.

Figure 10:
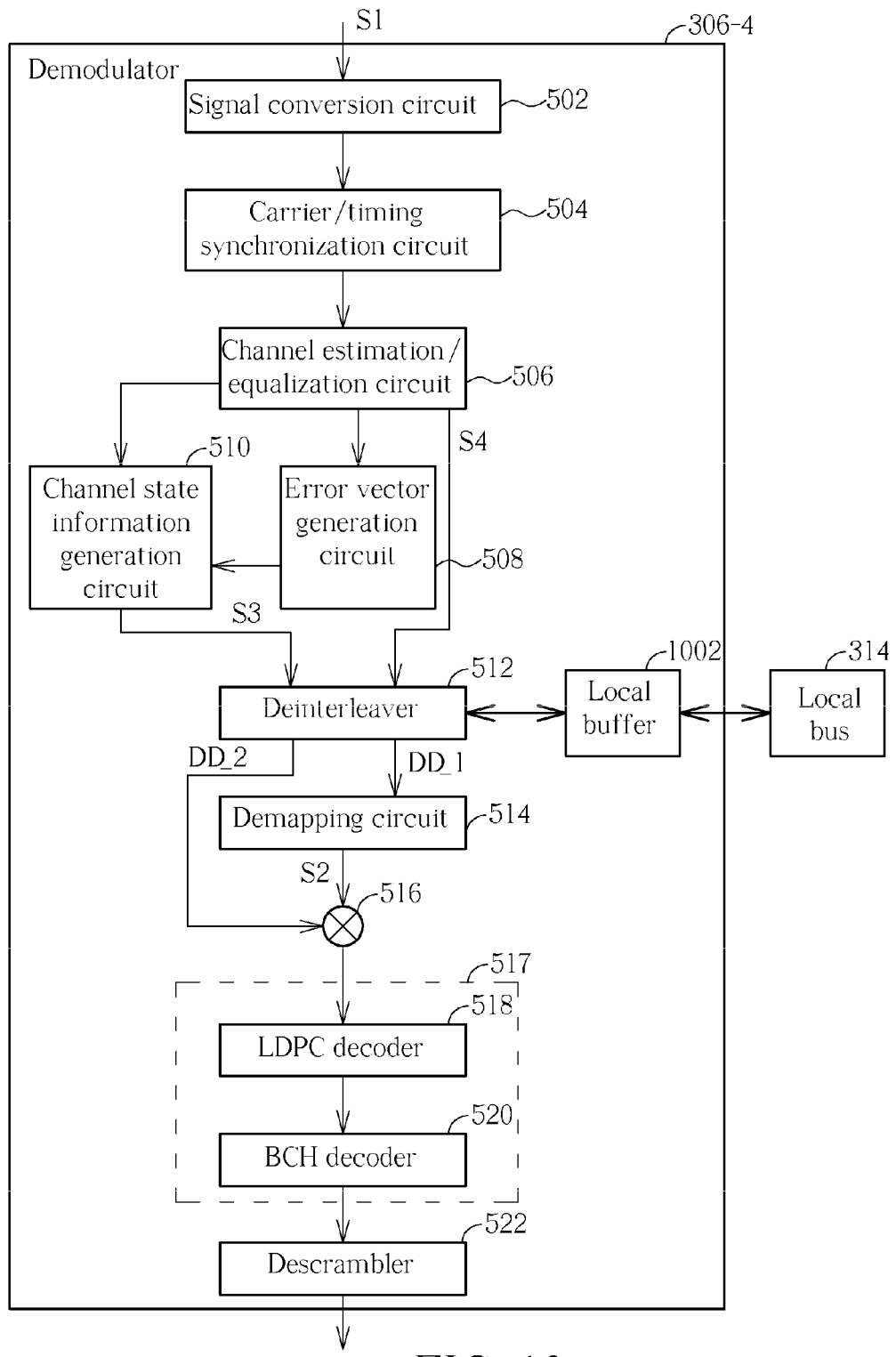
FIG. 10 is a fourth exemplary embodiment of the demodulator shown in FIG. 3.

Similarly, the local buffer may be employed in the exemplary embodiment shown in FIG. 5. Please refer to FIG. 10, which is a fourth exemplary embodiment of the demodulator shown in FIG. 3. The exemplary embodiment shown in FIG. 10 is similar to that shown in FIG. 5, and the major difference therebetween is that the demodulator 306-4 has an additional local buffer 1002 implemented therein. Please note that the local buffer 1002 and the deinterleaver 512 are both disposed inside the same chip (e.g., the demodulator chip), whereas the memory 312 shown in FIG. 3 is disposed outside of the chip. As the operation and function of the local buffer 1002 are similar to that of local buffers implemented in the exemplary embodiments shown in FIG. 8 and FIG. 9, further description is therefore omitted here for brevity.

In view of above, the wireless communication receiving method employed by the exemplary wireless communication receiver of the present invention can be briefly summarized as follows. The wireless communication receiving method includes the following steps: performing a first signal processing operation for receiving a wireless communication signal and generating a first output data according to the wireless communication signal; performing a deinterleaving operation for storing the first output data into a data storage module and retrieving a deinterleaved data corresponding to the first output data from the data storage module; and performing a second signal processing operation for generating a second output data according to the deinterleaved data. The data storage module is shared by the deinterleaving operation and at least one of the first signal processing operation and the second signal processing operation for data storage.

The exemplary wireless communication receiving method of the present invention may be employed in a digital television receiver, such as a receiver complying with the digital television standard defined by P.R.C. Besides, any digital television receiver using the exemplary wireless communication receiving method for allowing the deinterleaver and other signal processing circuit(s) to share the same data storage module for data storage falls within the scope of the present invention.

Those skilled in the art will readily observe that numerous modifications and alterations of the device and method may be made while retaining the teachings of the invention.

What is claimed is:

1. A wireless communication receiver, comprising:
a data storage module;
a deinterleaver, coupled to the data storage module, for storing a first output data into the data storage module, and retrieving a deinterleaved data corresponding to the first output data from the data storage module; and
a plurality of signal processing circuits, comprising:
a first signal processing circuit, coupled to the deinterleaver, for receiving a wireless communication signal, and generating the first output data by performing a first signal processing operation according to the wireless communication signal, wherein the first signal processing circuit comprises:
a signal receiving circuit for receiving the wireless communication signal and accordingly generating a received signal;
a channel estimation/equalization circuit for generating a channel estimation/equalization output by performing a channel estimation/equalization according to the received signal; and
a channel state information generation circuit for generating a channel state information, wherein the first output data includes the channel estimation/equalization output and the channel state information; and
a second signal processing circuit, coupled to the deinterleaver, for generating a second output data by performing a second signal processing operation according to the deinterleaved data;
wherein the data storage module is shared by the deinterleaver and the second signal processing circuit for data storage, and the deinterleaver is further coupled to the channel estimation/equalization circuit and the channel state information generation circuit, and utilized for storing the channel estimation/equalization output and the channel state information into the data storage module, respectively, and retrieving a deinterleaved data corresponding to the channel estimation/equalization output and a deinterleaved data corresponding to the channel state information from the data storage module, respectively.

2. The wireless communication receiver of claim 1, wherein the wireless communication signal is an orthogonal frequency division multiplexing (OFDM) signal.

3. The wireless communication receiver of claim 1, wherein the wireless communication signal is a digital television signal.

4. The wireless communication receiver of claim 3, wherein the digital television signal complies with a digital television standard defined by People's Republic of China (P.R.C.).

5. The wireless communication receiver of claim 1, wherein the first output data is a soft decision output.

6. The wireless communication receiver of claim 5, wherein the first signal processing circuit further comprises:
a demapping circuit, for generating a demapping output according to the received signal; and
a multiplier, coupled to the demapping circuit, the channel state information generation circuit, and the deinterleaver, for generating the first output data to the deinterleaver according to the demapping output and the channel state information.

7. The wireless communication receiver of claim 1, further comprising:
a data buffer module, coupled between the data storage module and the deinterleaver, for buffering data transmitted between the data storage module and the deinterleaver;
wherein the data buffer module and the deinterleaver are both disposed inside a chip, and the data storage module is disposed outside of the chip.

8. The wireless communication receiver of claim 7, wherein the data buffer module comprises:
an input buffer, for continuously writing buffered data in the input buffer into the data storage buffer when a data amount of the buffered data in the input buffer reaches a predetermined value; and
an output buffer, for continuously buffering data read from the data storage module until a data amount of buffered data in the output buffer reaches a predetermined value.

9. The wireless communication receiver of claim 7, wherein the first output data corresponds to a first bit width, the data buffer module and the data storage module transmit data therebetween according to a second bit width, and the first bit width is different from the second bit width.

10. The wireless communication receiver of claim 9, wherein data that is buffered in the data buffer module and corresponds to the first output data has a third bit width less than the first bit width.

11. The wireless communication receiver of claim 1, wherein the deinterleaver is utilized for performing a convolutional deinterleaving operation; the data storage module includes a plurality of data buffer blocks corresponding to a plurality of deinterleaving branches, respectively; and buffer lengths of the data buffer blocks are greater than minimum buffer lengths required by the corresponding deinterleaving branches involved in performing the convolutional deinterleaving operation, respectively.

12. A wireless communication receiving method, comprising:
   performing a first signal processing operation for receiving a wireless communication signal and generating a first output data according to the wireless communication signal;
   performing a deinterleaving operation for storing the first output data into a data storage module and retrieving a deinterleaved data corresponding to the first output data from the data storage module; and
   performing a second signal processing operation for generating a second output data according to the deinterleaved data;
   wherein the data storage module is shared by the deinterleaving operation and the second signal processing operation for data storage, and the first signal processing operation comprises:
      receiving the wireless communication signal and accordingly generating a received signal;
      generating a channel state information; and
      generating a channel estimation/equalization output by performing a channel estimation/equalization according to the received signal, wherein the first output data includes the channel estimation/equalization output and the channel state information, and the deinterleaving operation stores the channel estimation/equalization output and the channel state information into the data storage module, respectively, and retrieves a deinterleaved data corresponding to the channel estimation/equalization output and a deinterleaved data corresponding to the channel state information from the data storage module, respectively.

13. The wireless communication receiving method of claim 12, wherein the wireless communication signal is an orthogonal frequency division multiplexing (OFDM) signal.

14. The wireless communication receiving method of claim 12, wherein the wireless communication signal is a digital television signal.

15. The wireless communication receiving method of claim 14, wherein the digital television signal complies with a digital television standard defined by People's Republic of China (P.R.C.).

16. The wireless communication receiving method of claim 12, wherein the first output data is a soft decision output.

17. The wireless communication receiving method of claim 16, the first signal processing operation further comprises:
   generating a demapping output according to the received signal;
   and
   generating the first output data according to a product of the demapping output and the channel state information.

18. The wireless communication receiving method of claim 12, further comprising:
   providing a data buffer module, and utilizing the data buffer module for buffering the first output data generated from the deinterleaving operation to the data storage module and buffering the deinterleaved data read from the data storage module;
   wherein the first output data corresponds to a first bit width, the data buffer module and the data storage module transmit data therebetween according to a second bit width, and the first bit width is different from the second bit width.

19. The wireless communication receiving method of claim 18, wherein data that is buffered in the data buffer module and corresponds to the first output data has a third bit width less than the first bit width.

20. The wireless communication receiving method of claim 12, wherein the deinterleaving operation is a convolutional deinterleaving operation; the data storage module includes a plurality of data buffer blocks corresponding to a plurality of deinterleaving branches, respectively; and buffer lengths of the data buffer blocks are greater than minimum buffer lengths required by the corresponding deinterleaving branches involved in performing the convolutional deinterleaving operation, respectively.

21. A wireless communication receiver, comprising:
   a data storage module;
   a memory bus, coupled to the data storage module;
   a deinterleaver, coupled to the data storage module, for storing a first output data into the data storage module, and retrieving a deinterleaved data corresponding to the first output data from the data storage module; and
   a plurality of signal processing circuits, comprising:
      a first signal processing circuit, coupled to the deinterleaver, for receiving a wireless communication signal and generating the first output data by performing a first signal processing operation according to the wireless communication signal, wherein the first signal processing circuit comprises:
         a signal receiving circuit for receiving the wireless communication signal and accordingly generating a received signal;
         a channel estimation/equalization circuit for generating a channel estimation/equalization output by performing a channel estimation/equalization according to the received signal; and
         a channel state information generation circuit for generating a channel state information, wherein the first output data includes the channel estimation/equalization output and the channel state information; and
      a second signal processing circuit, coupled to the deinterleaver, for generating a second output data by performing a second signal processing operation according to the deinterleaved data;
   wherein the deinterleaver and the second signal processing circuit access the data storage module via the memory bus, and the deinterleaver is further coupled to the channel estimation/equalization circuit and the channel state information generation circuit, and utilized for storing the channel estimation/equalization output and the channel state information into the data storage module, respectively, and retrieving a deinterleaved data corresponding to the channel estimation/equalization output and a deinterleaved data corresponding to the channel state information from the data storage module, respectively.

22. The wireless communication receiver of claim 21, wherein the first output data is a soft decision output.

23. The wireless communication receiver of claim 21, further comprising:
   a memory controller, for arbitrating an access right of the memory bus requested by the deinterleaver and the at least one of the signal processing circuits.

24. The wireless communication receiver of claim 21, further comprising:
a data buffer module, coupled between the data storage module and the deinterleaver, for buffering data transmitted between the data storage module and the deinterleaver;
wherein the first output data corresponds to a first bit width, the memory bus has a second bit width, and the first bit width is different from the second bit width.

25. The wireless communication receiver of claim 24, wherein data that is buffered in the data buffer module and corresponds to the first output data has a third bit width less than the first bit width.

26. A television receiver, comprising:
a data storage module;
a demodulator, for receiving and demodulating a digital television signal and accordingly generating a bit stream, the demodulator comprising:
   a first signal processing circuit, for generating a first output data by performing a first signal processing operation according to the digital television signal, wherein the first signal processing circuit comprises:
      a signal receiving circuit for receiving the digital television signal and accordingly generating a received signal;
      a channel estimation/equalization circuit for generating a channel estimation/equalization output by performing a channel estimation/equalization according to the received signal; and
      a channel state information generation circuit for generating a channel state information, wherein the first output data includes the channel estimation/equalization output and the channel state information; and
   a deinterleaver, coupled to the first signal processing circuit and the data storage module, for storing the first output data into the data storage module and retrieving a deinterleaved data corresponding to the first output data from the data storage module;
   an error-correction decoding module, coupled to the deinterleaver, for performing an error-correction decoding operation according to the deinterleaved data; and
   a descrambler, coupled to the error-correction decoding module, for generating the bit stream by performing a descrambling operation according to an output of the error-correction decoding module; and
a backend decoder, coupled to the demodulator, for receiving and decoding the bit stream;
wherein the data storage module is shared by the deinterleaver and the backend decoder for data storage, and the deinterleaver is further coupled to the channel estimation/equalization circuit and the channel state information generation circuit, and utilized for storing the channel estimation/equalization output and the channel state information into the data storage module, respectively, and retrieving a deinterleaved data corresponding to the channel estimation/equalization output and a deinterleaved data corresponding to the channel state information from the data storage module, respectively.

27. The television receiver of claim 26, wherein the first signal processing circuit further comprises:
a demapping circuit, for generating a demapping output according to the received signal; and
a multiplier, coupled to the demapping circuit, the channel state information generation circuit, and the deinterleaver, for generating the first output data to the deinterleaver according to the demapping output and the channel state information.

28. The television receiver of claim 26, wherein the error-correction decoding module comprises:
a low-density parity-check (LDPC) decoder, coupled to the deinterleaver, for generating an LDPC decoding output by performing an LDPC decoding operation according to the deinterleaved data; and
a Bose-Chaudhuri-Hocquenghem (BCH) decoder, coupled to the LDPC decoder, for generating a BCH decoding output by performing a BCH decoding operation according to the LDPC decoding output, wherein the descrambler generates the bit stream by performing the descrambling operation upon the BCH decoding output.

29. The television receiver of claim 26, wherein the first output data is a soft decision output.

30. The television receiver of claim 26, wherein the digital television signal complies with a digital television standard defined by People's Republic of China (P.R.C.).

31. The television receiver of claim 26, further comprising:
a data buffer module, coupled between the data storage module and the deinterleaver, for buffering data transmitted between the data storage module and the deinterleaver;
wherein the data buffer module and the deinterleaver are both disposed inside a chip, and the data storage module is disposed outside of the chip.

32. The television receiver of claim 31, wherein the data buffer module comprises:
an input buffer, for continuously writing buffered data in the input buffer into the data storage buffer when a data amount of the buffered data in the input buffer reaches a predetermined value; and
an output buffer, for continuously buffering data read from the data storage module until a data amount of buffered data in the output buffer reaches a predetermined value.

33. The television receiver of claim 31, wherein the first output data corresponds to a first bit width, the data buffer module and the data storage module transmit data therebetween according to a second bit width, and the first bit width is different from the second bit width.

34. The television receiver of claim 31, wherein data that is buffered in the data buffer module and corresponds to the first output data has a third bit width less than the first bit width.

* * * * *